(12) United States Patent
Sampson et al.

(10) Patent No.: US 6,851,750 B2
(45) Date of Patent: Feb. 8, 2005

(54) CHILD-SEAT LINERS

(75) Inventors: Jennifer M. Sampson, Toledo, OH (US); Steven M. Sampson, Toledo, OH (US)

(73) Assignee: Bilby Products, LLC, Sylvania, OH (US)

( * ) Notice: Subject to any disclaimer, the term of this patent is extended or adjusted under 35 U.S.C. 154(b) by 0 days.

(21) Appl. No.: 10/375,577

(22) Filed: Feb. 27, 2003

(65) Prior Publication Data

US 2004/0066070 A1 Apr. 8, 2004

Related U.S. Application Data

(60) Provisional application No. 60/360,446, filed on Feb. 28, 2002.

(51) Int. Cl.[7] .............................. A47C 1/08; A47D 1/10
(52) U.S. Cl. ........................... 297/256.17; 297/219.12; 297/228.12; 297/229
(58) Field of Search .................... 297/219.1, 256.17, 297/219.12, 225, 228, 228.1, 228.11, 288.12, 228.13, 229, 230.1, 230.11, 230.12, 230.13, 230.14

(56) References Cited

U.S. PATENT DOCUMENTS

| | | | |
|---|---|---|---|
| 4,204,695 A | | 5/1980 | Salzman ................ 280/33.993 |
| 4,416,462 A | * | 11/1983 | Thompson ............. 280/33.993 |
| 4,655,502 A | | 4/1987 | Houllis ........................ 297/229 |
| 4,666,207 A | | 5/1987 | Quartano .................... 297/229 |
| 4,805,937 A | | 2/1989 | Bouchert ................ 280/33.992 |
| 5,238,293 A | * | 8/1993 | Gibson ........................ 297/229 |
| 5,330,250 A | | 7/1994 | Reyes ......................... 297/229 |
| 5,547,250 A | | 8/1996 | Childers ................. 297/256.17 |
| 5,584,422 A | * | 12/1996 | Bond-Madsen ............. 224/155 |
| 5,639,145 A | * | 6/1997 | Alderman ............... 297/452.45 |
| 5,641,199 A | * | 6/1997 | Bond-Madsen ............. 297/229 |
| 5,678,888 A | * | 10/1997 | Sowell et al. .......... 297/256.17 |
| 5,829,835 A | * | 11/1998 | Rogers et al. ......... 297/256.17 |
| 5,855,412 A | * | 1/1999 | Smith et al. ........... 297/256.17 |
| 5,897,165 A | | 4/1999 | Kucharczyk et al. ... 297/256.17 |
| 5,957,528 A | * | 9/1999 | Campbell ............... 297/228.12 |
| 5,967,606 A | | 10/1999 | Bergh et al. ........... 297/256.17 |
| 5,967,607 A | | 10/1999 | Waldroup .............. 297/256.17 |
| 6,036,264 A | | 3/2000 | Lucree .................... 297/256.17 |
| 6,129,417 A | * | 10/2000 | Cohen-Fyffe .......... 297/219.12 |
| 6,129,418 A | | 10/2000 | Bergh et al. ........... 297/256.17 |
| 6,145,932 A | * | 11/2000 | Hamel-Nyhus et al. ..... 297/465 |
| 6,164,721 A | | 12/2000 | Latshaw et al. ....... 297/256.17 |
| 6,206,471 B1 | * | 3/2001 | McGowan ............. 297/256.17 |
| 6,224,152 B1 | * | 5/2001 | Hughes et al. ......... 297/256.17 |
| 6,237,998 B1 | * | 5/2001 | Aprile .................... 297/219.12 |
| 6,491,996 B2 | * | 12/2002 | Digangi ....................... 428/43 |
| 6,527,339 B2 | * | 3/2003 | Voris ..................... 297/219.12 |
| D484,665 S | * | 12/2003 | Richardson ........ 297/256.17 X |
| 6,702,381 B2 | * | 3/2004 | Endicott et al. ....... 297/256.17 |
| 2001/0022457 A1 | * | 9/2001 | Voris ..................... 297/219.12 |
| 2001/0048235 A1 | * | 12/2001 | Hartranft ............... 297/219.12 |
| 2003/0227202 A1 | * | 12/2003 | Endicott et al. ....... 297/256.17 |

* cited by examiner

*Primary Examiner*—Rodney B. White
(74) *Attorney, Agent, or Firm*—Medlen & Carroll, LLP

(57) ABSTRACT

The present invention relates to child-seat liners. Specifically, the present invention provides protective articles comprising child-seat liners, systems comprising child-seat liners, methods for using child-seat liners (e.g. with a shopping cart), and methods for making child-seat liners. The present invention also provides child-seat liner cut-pieces and patterns.

16 Claims, 5 Drawing Sheets

CHILD-SEAT LINERS

The present Application claims priority to U.S. Provisional Application Ser. No. 60/360,446 filed Feb. 28, 2002, herein incorporated by reference.

FIELD OF THE INVENTION

The present invention relates to child-seat liners. Specifically, the present invention provides protective articles comprising child-seat liners, systems comprising child-seat liners, methods for using child-seat liners (e.g. with a shopping cart), and methods for making child-seat liners. The present invention also provides child-seat liner cut-pieces and patterns.

BACKGROUND OF THE INVENTION

Shopping cart child seats/baskets and shopping cart handles tend to be unclean and dangerous for children. Many types of bacteria, mold, and yeast have been found on shopping cart baskets and handles, including Coliform, *E. coli*, and *staphylococcus*. Dust, dirt, soil and fecal matter has also been found on shopping cart handles and baskets. Furthermore, the national SAFE KIDS campaign has reported dramatic statistics regarding the dangers of shopping carts for children, such as the fact that at least five children since 1985 have died as a result of shopping cart accidents. Also, in 1998, nearly 25,600 children were treated for shopping cart injuries, with eighty-three percent of the injuries accounted for by children under four years old (according to the national SAFE KIDS campaign).

Many parents use child-seat liners positioned in the shopping cart basket of a shopping cart in an attempt to protect their child and make their child more comfortable while sitting in the shopping cart basket during a shopping trip. While many child-seat liners are known, many of these are hard to use, don't satisfactorily protect the child, or may fall out of the shopping cart basket. What is needed is a child-seat liner that is easy to secure to the child seat and that protects the child from contact with unclean shopping cart handles and baskets.

SUMMARY OF THE INVENTION

The present invention provides protective articles comprising child-seat liners, systems comprising child-seat liners, methods for using child-seat liners (e.g. with a shopping cart, high-chair, or other child-seat with safety straps), and methods for making child-seat liners. The present invention also provides child-seat liner cut-pieces and patterns.

In some embodiments, the present invention provides articles (e.g. child protecting articles) comprising a child-seat liner, wherein the child-seat liner comprises; i) a bottom panel, and ii) a back panel connected to the bottom panel, wherein the back panel comprises a flap, and wherein the flap is moveable between a closed position and an open position, wherein the open position forms a safety strap opening in the back panel. In particular embodiments, the bottom panel is cushioned (e.g. such that a child may sit on it comfortably). In other embodiments, the back panel is cushioned (e.g. such that a child may lean their back against it comfortably). In particular embodiments, the back and/or bottom panel comprise two layers of fabric with a fiberfill type material between the layers of fabric.

In particular embodiments, the panels (e.g. back, bottom, front, and sides) comprise fabrics that comprise cotton, nylon, polyester, polycotton, wool, linen, flax, jute, rayon, acrylic fiber, calico, muslin, canvas, silk, or combinations thereof. In certain embodiments, the panels comprise leather, vinyl, plastic, corduroy, denim, twill, polyester, cotton, or other material. In some embodiments, the panels comprise an anti-bacterial compound.

In certain embodiments, the child-seat liner further comprises a front panel connected to (e.g. integral with or sewn to) the bottom panel. In other embodiments, the front panel further comprises at least one front opening. In particular embodiments, the front opening is configured for one leg or two legs of a child sitting in the child-seat liner. In preferred embodiments, the front panel further comprises two front openings. In some embodiments, the front opening or front openings have binding around their edge.

In some embodiments, the child-seat liner further comprises two side panels, wherein each of the side panels is connected to the bottom panel. In other embodiments, the child-seat liner further comprises two side panels, wherein each of the side panels is connected to (e.g. integral with or sewn to) the bottom panel, the back panel, and the front panel. In preferred embodiments, the child-seat liner does not contain attached safety straps.

In certain embodiments, the back panel is configured to substantially cover a shopping cart basket back wall (e.g. the back panel covers at least 85%, preferably 95%, or more preferably 99–100% of the back wall). In other embodiments, the bottom panel is configured to substantially cover a shopping cart basket bottom (e.g. the bottom panel covers at least 85%, preferably 95%, or more preferably 99–100% of the bottom). In some embodiments, the front panel is configured to substantially cover a shopping cart basket front wall (e.g. the front panel covers at least 85%, preferably 95%, or more preferably 99–100% of the front wall). In other embodiments, each of the side panels is configured to substantially cover a shopping cart basket side wall (e.g. each of the side panels covers at least 85%, preferably 95%, or more preferably 99–100% of the side walls).

In particular embodiments, the flap has a shape selected from a rectangle, a square, a circle, a half circle, a trapezoid, octagon, a triangle, or a shape similar to one of these shapes. In certain embodiments, the flap has a surface area of at least four square inches or at least five, six, seven, eight, nine, ten, eleven, twelve, fifteen, twenty, twenty-five, thirty, forty, fifty, or at least sixty square inches. In other embodiments, the safety strap opening has a size that is at least five square inches, at least six, seven, eight, nine, ten, eleven, twelve, fifteen, twenty, twenty-five, thirty, forty, fifty, or sixty square inches. In some embodiments, the surface area of the flap is approximately the same size as the safety strap opening. In preferred embodiments, the safety strap opening is configured to allow both a first safety strap and a second safety strap to pass through the safety strap opening. In other preferred embodiments, the flap is configured to allow a user to pull at least one safety strap attached to the shopping cart seat through the safety strap opening. In some embodiments, the flap has binding around its edges.

In certain embodiments, the child-seat liner is configured to position within a shopping cart seat. In other embodiments, the child-seat liner is configured to position within a high chair. In further embodiments, the child-seat liner is configured to position within a child's car seat or any other type of child-seat with safety straps.

In certain embodiments, the article further comprises a handle cover. In some embodiments, the article further comprises a handle cover, wherein the handle cover is connected to (e.g. integral with or sewn to) the front panel. In additional embodiments, the handle cover comprises a securing component (e.g. in order to secure the handle cover to a shopping cart handle such that it does not slip off). In some embodiments, the securing component is selected from elastic, VELCRO, and snaps. In particular embodiments, the article further comprises a rear pouch. In other embodiments, the article further comprises a rear pouch, wherein the rear pouch is connected to (e.g. integral with or sewn to) the back panel. In some embodiments, the rear pouch comprises storage strap fastener. In particular embodiments, the rear pouch comprises a pouch opening. In certain embodiments, the rear pouch comprises a closing component to open and close the pouch opening (e.g. a zipper, VELCRO, or a series of snaps). In certain preferred embodiments, the rear pouch comprises a zipper. In some embodiments, the article further comprises a storage strap.

In some embodiments, the present invention provides articles (e.g. to protect children) comprising a child-seat liner, wherein the child-seat liner comprises; i) a bottom panel, and ii) a back panel connected to the bottom panel, wherein the back panel comprises a first safety strap opening, and wherein the back panel does not contain a second safety strap opening. In certain embodiments, the back panel comprises additional openings, but none of these openings are configured (e.g. large enough or in the right position) to allow safety straps (e.g. from a shopping cart) to pass therethrough. In particular embodiments, the bottom panel is cushioned (e.g. such that child may sit on it comfortably). In other embodiments, the back panel is cushioned (e.g. such that a child may lean their back against it comfortably). In particular embodiments, the back and/or bottom panel comprise two layers of fabric with a fiberfill type material between the layers of fabric.

In particular embodiments, the child-seat liner further comprises a front panel connected to the bottom panel. In other embodiments, the front panel further comprises at least one front opening. In some embodiments, the front opening is configured for one leg or two legs of a child sitting in the child seat liner. In preferred embodiments, the front panel further comprises two front openings.

In other embodiments, the child-seat liner further comprises two side panels, wherein each of the side panels is connected to the bottom panel. In some embodiments, the child-seat liner further comprises two side panels, wherein each of the side panels is connected to the bottom panel, the back panel, and the front panel. In other embodiments, the child-seat liner does not contain attached safety straps.

In certain embodiments, the back panel is configured to substantially cover a shopping cart basket back wall (e.g. the back panel covers at least 85%, preferably 95%, or more preferably 99–100% of the back wall). In other embodiments, the bottom panel is configured to substantially cover a shopping cart basket bottom (e.g. the bottom panel covers at least 85%, preferably 95%, or more preferably 99–100% of the bottom). In some embodiments, the front panel is configured to substantially cover a shopping cart basket front wall (e.g. the front panel covers at least 85%, preferably 95%, or more preferably 99–100% of the front wall). In other embodiments, each of the side panels is configured to substantially cover a shopping cart basket side wall (e.g. each of the side panels covers at least 85%, preferably 95%, or more preferably 99–100% of the side walls).

In certain embodiments, the child-seat liner is configured to position within a shopping cart seat (basket). In other embodiments, the child-seat liner is configured to position within a high chair. In further embodiments, the child-seat liner is configured to position within a child's car seat.

In certain embodiments, the article further comprises a handle cover. In some embodiments, the article further comprises a handle cover, wherein the handle cover is connected to (e.g. integral with or sewn to) the front panel. In additional embodiments, the handle cover comprises a securing component (e.g. in order to secure the handle cover to a shopping cart handle such that it does not slip off). In some embodiments, the securing component is selected from elastic, VELCRO, and snaps. In particular embodiments, the article further comprises a rear pouch. In other embodiments, the article further comprises a rear pouch, wherein the rear pouch is connected to (e.g. integral with or sewn to) the back panel. In some embodiments, the rear pouch comprises a storage strap fastener. In particular embodiments, the rear pouch comprises a pouch opening. In some embodiments, the article further comprises a storage strap. In certain embodiments, the rear pouch comprises a closing component to open and close the pouch opening (e.g. a zipper, VELCRO, or a series of snaps). In certain preferred embodiments, the rear pouch comprises a zipper.

In some embodiments, the back panel further comprises a flap, wherein the flap is moveable between a closed position substantially covering the first safety strap opening and an open position that exposes the first safety strap opening. In further embodiments, the back panel further comprises a flap, wherein the flap is moveable between a closed position substantially covering the first safety strap opening (e.g. covering at least 50%, 60%, 75%, 85%, 90%, 95%, 98%, or 100% of the first safety strap opening) and an open position that exposes the first safety strap opening (e.g. at least 5%, 10%, 25%, or 50% of the first safety strap opening is exposed).

In particular embodiments, the flap has a shape selected from a rectangle, a square, a circle, a half circle, a trapezoid, octagon, a triangle, or a shape similar to one of these shapes. In certain embodiments, the flap has a surface area of at least four square inches or at least five, six, seven, eight, nine, ten, eleven, twelve, fifteen, twenty, twenty-five, thirty, forty, fifty, or at least sixty square inches. In other embodiments, the safety strap opening has a size that is at least five square inches, at least six, seven, eight, nine, ten, eleven, twelve, fifteen, twenty, twenty-five, thirty, forty, fifty, or sixty square inches. In some embodiments, the surface area of the flap is approximately the same size as the first safety strap opening. In preferred embodiments, the safety strap opening is configured to allow both a first safety strap and a second safety strap to pass through the safety strap opening. In other preferred embodiments, the flap is configured to allow a user to pull at least one safety strap attached to the shopping cart seat through the safety strap opening.

In certain embodiments, the present invention provides articles comprising a child-seat liner cut-piece (e.g. a piece of fabric or filler material that has been cut out based on a child-seat liner pattern). In some embodiments, the present invention provides articles comprising a child-seat liner cut-piece, wherein the child-seat liner cut-piece comprises; i) a bottom panel, and ii) a back panel connected to the bottom panel, wherein the back panel comprises a flap, and wherein the flap is moveable between a closed position and an open position, wherein the open position forms a safety strap opening in the back panel.

In particular embodiments, the child-seat liner cut-piece further comprises a front panel connected to (e.g. integral with) the bottom panel. In certain embodiments, the front panel further comprises at least one front opening. In other embodiments, the front panel further comprises two front openings. In some embodiments, the child-seat liner cut-piece further comprises two side panels, wherein each of the side panels is connected to (e.g. integral with) the bottom panel.

In certain embodiments, the back panel is configured to substantially cover a shopping cart basket back wall (e.g. the back panel covers at least 85%, preferably 95%, or more preferably 99–100% of the back wall). In other embodiments, the bottom panel is configured to substantially cover a shopping cart basket bottom (e.g. the bottom panel covers at least 85%, preferably 95%, or more preferably 99–100% of the bottom). In some embodiments, the front panel is configured to substantially cover a shopping cart basket front wall (e.g. the front panel covers at least 85%, preferably 95%, or more preferably 99–100% of the front wall). In other embodiments, each of the side panels is configured to substantially cover a shopping cart basket side wall (e.g. each of the side panels covers at least 85%, preferably 95%, or more preferably 99–100% of the side walls).

In particular embodiments, the flap has a shape selected from a rectangle, a square, a circle, a half circle, a trapezoid, octagon, a triangle, or a shape similar to one of these shapes. In certain embodiments, the flap has a surface area of at least four square inches or at least five, six, seven, eight, nine, ten, eleven, twelve, fifteen, twenty, twenty-five, thirty, forty, fifty, or at least sixty square inches. In other embodiments, the safety strap opening has a size that is at least five square inches, at least six, seven, eight, nine, ten, eleven, twelve, fifteen, twenty, twenty-five, thirty, forty, fifty, or sixty square inches. In some embodiments, the surface area of the flap is approximately the same size as the safety strap opening. In preferred embodiments, the safety strap opening is configured to allow both a first safety strap and a second safety strap to pass through the safety strap opening.

In particular embodiments, the child-seat liner cut-piece is configured to be sewn into a child-seat liner. In some embodiments, the child-seat liner cut-piece is configured to be sewn into a child-seat liner, wherein the child-seat liner is configured to position within a shopping cart seat/basket. In other embodiments, the child-seat liner cut-piece is configured to be sewn into a child-seat liner, wherein the child-seat liner is configured to position within a high chair. In further embodiments, the child-seat liner cut-piece is configured to be sewn into a child-seat liner, wherein the child-seat liner is configured to position within a child's car seat.

In some embodiments, the present invention provides articles comprising a child-seat liner cut-piece, wherein the child-seat liner cut-piece comprises; i) a bottom panel, and ii) a back panel connected to (e.g. integral with) the bottom panel, wherein the back panel comprises a first safety strap opening, and wherein the back panel does not contain a second safety strap opening. In certain embodiments, the child-seat liner cut-piece further comprises a front panel connected to (e.g. integral with) the bottom panel. In other embodiments, the front panel further comprises at least one front opening. In additional embodiments, the front panel further comprises two front openings. In some embodiments, the child-seat liner cut-piece further comprises two side panels, wherein each of the side panels is connected to the bottom panel.

In certain embodiments, the back panel is configured to substantially cover a shopping cart basket back wall (e.g. the back panel covers at least 85%, preferably 95%, or more preferably 99–100% of the back wall). In other embodiments, the bottom panel is configured to substantially cover a shopping cart basket bottom (e.g. the bottom panel covers at least 85%, preferably 95%, or more preferably 99–100% of the bottom). In some embodiments, the front panel is configured to substantially cover a shopping cart basket front wall (e.g. the front panel covers at least 85%, preferably 95%, or more preferably 99–100% of the front wall). In other embodiments, each of the side panels is configured to substantially cover a shopping cart basket side wall (e.g. each of the side panels covers at least 85%, preferably 95%, or more preferably 99–100% of the side walls).

In certain embodiments, the first safety strap opening has a size that is at least five square inches, at least six, seven, eight, nine, ten, eleven, twelve, fifteen, twenty, twenty-five, thirty, forty, fifty, or sixty square inches. In other embodiments, the first safety strap opening is configured to allow both a first safety strap and a second safety strap to pass through the safety strap opening.

In particular embodiments, the child-seat liner cut-piece is configured to be sewn into a child-seat liner. In some embodiments, the child-seat liner cut-piece is configured to be sewn into a child-seat liner, wherein the child-seat liner is configured to position within a shopping cart seat. In other embodiments, the child-seat liner cut-piece is configured to be sewn into a child-seat liner, wherein the child-seat liner is configured to position within a high chair. In further embodiments, the child-seat liner cut-piece is configured to be sewn into a child-seat liner, wherein the child-seat liner is configured to position within a child's car seat.

In certain embodiments, the back panel further comprises a flap, wherein the flap is moveable between a closed position substantially covering the first safety strap opening and an open position that exposes the first safety strap opening. In some embodiments, the back panel further comprises a flap, wherein the flap is moveable between a closed position substantially covering the first safety strap opening (e.g. covering at least 50%, 60%, 75%, 85%, 90%, 95%, 98%, or 100% of the safety strap opening) and an open position that exposes the first safety strap opening (e.g. at least 5%, 10%, 25%, or 50% of the safety strap opening is exposed).

In some embodiments, the flap has a shape selected from a rectangle, a square, a circle, a half circle, a trapezoid, octagon, or a triangle. In other embodiments, the flap has a surface area of at least four square inches, at least five square inches, at least six, seven, eight, nine, ten, eleven, twelve, fifteen, twenty, twenty-five, thirty, forty, fifty, or sixty square inches.

In additional embodiments, the present invention provides systems comprising; a) a shopping cart, wherein the shopping cart comprises a shopping cart basket, and wherein the shopping cart basket comprises a first safety strap and a second safety strap; and b) an article comprising a child-seat liner positioned within the shopping cart basket, wherein the child-seat liner comprises; i) a bottom panel, and ii) a back panel connected to the bottom panel, wherein the back panel comprises a flap, and wherein the flap is moveable between a closed position and an open position, wherein the open position forms a safety strap opening in the back panel.

In certain embodiments, the safety strap opening allows both the first safety strap and the second safety strap to pass through the safety strap opening. In further embodiments, the shopping cart basket further comprises; i) a shopping cart basket bottom, ii) a shopping cart basket back wall, iii) a shopping cart basket front wall, and iv) two shopping cart basket side walls, and wherein the first and second safety straps are attached to the shopping cart basket back wall or the shopping cart basket bottom. In some embodiments, the safety strap opening allows both the first safety strap and the second safety strap to pass through the safety strap opening.

In additional embodiments, the back panel substantially covers the shopping cart basket back wall. In other embodiments, the bottom panel substantially covers the shopping cart basket bottom. In further embodiments, the child-seat liner further comprises a front panel connected to the bottom panel. In particular embodiments, the front panel substantially covers the shopping cart basket front wall. In some embodiments, the front panel comprises at least one front opening. In additional embodiments, the front panel further comprises two front openings.

In some embodiments, the child-seat liner further comprises two side panels, wherein each of the side panels is connected to the bottom panel. In other embodiments, each of the side panels substantially covers one of the two shopping cart side walls. In further embodiments, the child-seat liner further comprises two side panels, wherein each of the side panels is connected to the bottom panel, the back panel, and the front panel. In other embodiments, the child-seat liner does not contain attached safety straps.

In some embodiments, the shopping cart further comprises a shopping cart handle, and the article further comprises a handle cover substantially covering the shopping cart handle. In other embodiments, the handle cover comprises a securing component. In certain embodiments, the article further comprises a rear pouch. In certain embodiments, the rear pouch comprises a closing component to open and close the pouch opening (e.g. a zipper, VELCRO, or a series of snaps). In certain preferred embodiments, the rear pouch comprises a zipper.

In some embodiments, the present invention provides systems comprising; a) a shopping cart, wherein the shopping cart comprises a shopping cart basket, and wherein the shopping cart basket comprises a first safety strap and a second safety strap; and b) an article comprising a child-seat liner, wherein the child-seat liner comprises; i) a bottom panel, and ii) a back panel connected to the bottom panel, wherein the back panel comprises a first safety strap opening, and wherein the back panel does not contain a second safety strap opening. In particular embodiments, the first safety strap opening allows both the first safety strap and the second safety strap to pass through the first safety strap opening.

In some embodiments, the shopping cart basket further comprises; i) a shopping cart basket bottom, ii) a shopping cart basket back wall, iii) a shopping cart basket front wall, and iv) two shopping cart basket side walls, and wherein the first and second safety straps are attached to the shopping cart basket back wall or the shopping cart basket bottom. In other embodiments, the first safety strap opening allows both the first safety strap and the second safety strap to pass through the safety strap opening. In further embodiments, the back panel substantially covers the shopping cart basket back wall. In certain embodiments, the bottom panel substantially covers the shopping cart basket bottom.

In additional embodiments, the child-seat liner further comprises a front panel connected to the bottom panel. In some embodiments, the front panel substantially covers the shopping cart basket front wall. In other embodiments, the front panel comprises at least one front opening. In preferred embodiments, the front panel further comprises two front openings. In other embodiments, the child-seat liner further comprises two side panels, wherein each of the side panels is connected to the bottom panel. In yet other embodiments, each of the side panels substantially covers one of the two shopping cart side walls. In preferred embodiments, the child-seat liner further comprises two side panels, wherein each of the side panels is connected to the bottom panel, the back panel, and the front panel. In some embodiments, the child-seat liner does not contain attached safety straps.

In other embodiments, the shopping cart further comprises a shopping cart handle, and the article further comprises a handle cover substantially covering the shopping cart handle. In some embodiments, the article further comprises a rear pouch.

In certain embodiments, the back panel further comprises a flap, wherein the flap is moveable between a closed position substantially covering the first safety strap opening and an open position that exposes the first safety strap opening. In particular embodiments, the back panel further comprises a flap, wherein the flap is moveable between a closed position substantially covering the first safety strap opening (e.g. covering at least 50%, 60%, 75%, 85%, 90%, 95%, 98%, or 100% of the safety strap opening) and an open position that exposes the first safety strap opening (e.g. at least 5%, 10%, 25%, or 50% of the safety strap opening is exposed).

In some embodiments, the present invention provides methods comprising; a) providing; i) a shopping cart, wherein the shopping cart comprises a shopping cart basket, and wherein the shopping cart basket comprises a first safety strap and a second safety strap; and ii) an article comprising a child-seat liner, wherein the child-seat liner comprises; i) a bottom panel, and ii) a back panel connected to the bottom panel, wherein the back panel comprises a flap, and wherein the flap is moveable between a closed position and an open position, wherein the open position forms a safety strap opening in the back panel; and b) positioning the article in the shopping cart basket, c) moving the flap to the open position, and d) pulling the first and second safety straps through the safety strap opening. In other embodiments, the methods further comprise step d) moving the flap to the closed position. In certain embodiments, the methods further comprise a step after step b), but before step c), of placing a child in the article. In other embodiments, the methods further comprise attaching the first safety strap and second safety strap to each other around the child (thereby securing the child in the seat, and securing the article to the shopping cart basket).

In some embodiments, moving the flap comprises lifting the flap upwards toward the interior of the article. In other embodiments, moving the flap comprises pushing the flap outward toward the exterior of the article. In some embodiments, pulling the first and second safety straps through the safety strap opening comprises reaching through the safety strap opening and grabbing the first and second safety straps.

In particular embodiments, the shopping cart basket further comprises; i) a shopping cart basket bottom, ii) a shopping cart basket back wall, iii) a shopping cart basket front wall, and iv) two shopping cart basket side walls, and wherein the first and second safety straps are attached to the shopping cart basket back wall or the shopping cart basket bottom. In some embodiments, positioning the article causes the back panel to substantially cover the shopping cart basket back wall. In other embodiments, positioning the article causes the bottom panel to substantially cover the shopping cart basket bottom. In other embodiments, the child-seat liner further comprises a front panel connected to the bottom panel. In particular embodiments, positioning the article causes the front panel to substantially cover the shopping cart basket front wall. In some embodiments, the child-seat liner further comprises two side panels, wherein each of the side panels is connected to the bottom panel. In further embodiments, positioning the article causes each of the side panels to substantially cover one of the two shopping cart side walls.

In some embodiments, the present invention provides methods comprising; a) providing; i) a shopping cart, wherein the shopping cart comprises a shopping cart basket, and wherein the shopping cart basket comprises a first safety strap and a second safety strap; and ii) an article comprising a child-seat liner, wherein the child-seat liner comprises; i) a bottom panel, and ii) a back panel connected to the bottom panel, wherein the back panel comprises a first safety strap opening, and wherein the back panel does not contain a second safety strap opening; and b) positioning the article in the shopping cart basket, and c) pulling the first and second safety strap openings through the safety strap opening. In certain embodiments, the methods further comprise a step after step b), but before step c), of placing a child in the article. In other embodiments, the methods further comprise attaching the first safety strap and second safety strap to each other around the child (thereby securing the child in the seat, and securing the article to the shopping cart basket).

In some embodiments, the pulling the first and second safety straps through the safety strap opening comprises reaching through the safety strap opening and grabbing the first and second safety straps. In other embodiments, the shopping cart basket further comprises; i) a shopping cart basket bottom, ii) a shopping cart basket back wall, iii) a shopping cart basket front wall, and iv) two shopping cart basket side walls, and wherein the first and second safety straps are attached to the shopping cart basket back wall or the shopping cart basket bottom. In additional embodiments, positioning the article causes the back panel to substantially cover the shopping cart basket back wall. In further embodiments, positioning the article causes the bottom panel to substantially cover the shopping cart basket bottom. In other embodiments, the child-seat liner further comprises a front panel connected to the bottom panel. In yet other embodiments, positioning the article causes the front panel to substantially cover the shopping cart basket front wall. In some embodiments, the child-seat liner further comprises two side panels, wherein each of the side panels is connected to the bottom panel. In certain embodiments, positioning the article causes each of the side panels to substantially cover one of the two shopping cart side walls.

In some embodiments, the back panel further comprises a flap, wherein the flap is moveable between a closed position substantially covering the first safety strap opening and an open position that exposes the first safety strap opening. In other embodiments, the method further comprises a step before step c) of moving the flap to the open position. In particular embodiments, moving the flap to the open position comprises lifting the flap upwards toward the interior of the article. In additional embodiments, moving the flap to the open position comprises pushing the flap outward toward the exterior of the article.

In some embodiments, the present invention provides methods for making a child-seat liner cut-piece comprising; a) providing; i) a child-seat liner pattern, ii) textile material, and iii) a cutting device; and b) cutting the textile material with the cutting device using the child-seat pattern as guide such that a child-seat liner cut-piece is generated. In certain embodiments, the child-seat liner cut-piece generated comprises; i) a bottom panel, and ii) a back panel connected to the bottom panel, wherein the back panel comprises a flap, and wherein the flap is moveable between a closed position and an open position, wherein the open position forms a safety strap opening in the back panel. In particular embodiments, the child-seat liner cut-piece generated comprises; i) a bottom panel, and ii) a back panel connected to the bottom panel, wherein the back panel comprises a first safety strap opening, and wherein the back panel does not contain a second safety strap opening. In certain embodiments, the cutting device is selected from a die cut steel rule press device, a laser cutting device, Gerber cutting device, manual scissors, automatic scissors, a razor blade, or a knife.

In other embodiments, the present invention provides methods for making a child-seat liner comprising; a) providing; i) a child-seat liner pattern, ii) first textile material, iii) second textile material, iv) filler material, and v) a cutting device, and b) cutting the first textile material, the second textile material, and the filler material with the cutting device using the child-seat pattern as a guide such that a first cut-piece, a second cut-piece, and a filler cut-piece are generated, c) combining the first cut-piece, the second cut-piece and the filler cut-piece such that a child-seat liner is generated with the filler cut-piece between the first cut-piece and the second-cut piece. In certain embodiments, the combining comprises a step of sewing the first cut-piece to the filler cut-piece in order to generate a composite cut-piece. In other embodiments, the combining further comprises a step of sewing the second cut-piece to itself in the form of a child-seat liner. In further embodiments, the combining further comprises a step of sewing the second cut-piece to the composite cut piece.

In some embodiments, the child-seat liner generated comprises; i) a bottom panel, and ii) a back panel connected to the bottom panel, wherein the back panel comprises a flap, and wherein the flap is moveable between a closed position and an open position, wherein the open position forms a safety strap opening in the back panel. In other embodiments, the child-seat liner generated comprises; i) a bottom panel, and ii) a back panel connected to the bottom panel, wherein the back panel comprises a first safety strap opening, and wherein the back panel does not contain a second safety strap opening. In particular embodiments, the cutting device is selected from a die cut steel rule press device, a laser cutting device, Gerber cutting device, manual scissors, automatic scissors, a razor blade, or a knife.

In some embodiments, the methods further comprise a step of sewing a handle cover cut-piece to the child-seat liner. In other embodiments, the methods further comprise a step of sewing a rear pouch cut-piece to the child-seat liner.

In certain embodiments, the present invention provides compositions comprising a steel rule die, wherein the steel rule die is configured to cut a child-seat liner cut-piece, wherein the child-seat liner cut piece comprises; i) a bottom panel, and ii) a back panel connected to the bottom panel, wherein the back panel comprises a flap, and wherein the flap is moveable between a closed position and an open position, wherein the open position forms a safety strap opening in the back panel.

In some embodiments, the child-seat liners of the present invention (e.g. with a flap or single safety strap opening in the back panel) are located in a transparent (e.g., clear vinyl or other plastic) pouch or bag with a zipper (e.g. for marketing and retail purposes). In additional embodiments, the child-seat liners of the present invention are sold over the Internet.

In other embodiments, the present invention provides compositions comprising a steel rule die, wherein the steel rule die is configured to cut a child-seat liner cut-piece, wherein the child-seat liner cut piece comprises; i) a bottom panel, and ii) a back panel connected to the bottom panel, wherein the back panel comprises a first safety strap opening, and wherein the back panel does not contain a second safety strap opening.

GENERAL DESCRIPTION OF THE INVENTION

Figure 1:
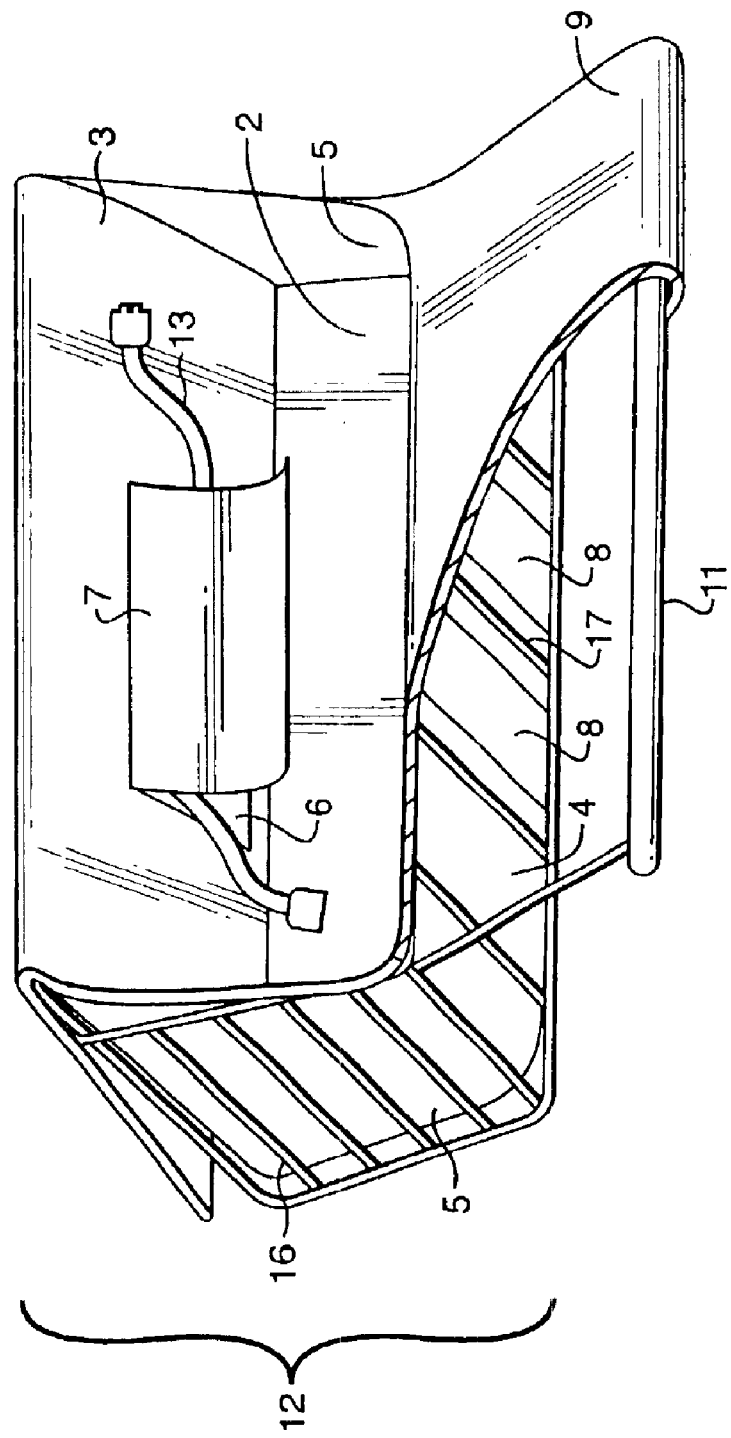
FIG. 1 shows a perspective view of one embodiment of protective article of the present invention.

The present invention relates to child-seat liners. Specifically, the present invention provides protective articles comprising child-seat liners, systems comprising child-seat liners, methods for using child-seat liners (e.g. with a shopping cart), and methods for making child-seat liners. The present invention also provides child-seat liner cut-pieces and patterns. In preferred embodiments, the child-seat liners of the present invention comprise a flap that may be moved between an open and closed position. In preferred embodiments, the open position forms a safety strap opening in the back panel of a child-seat liner. In other preferred embodiments, the child-seat liners of the present invention comprise a safety strap opening (e.g. a single safety-strap opening) that allows at least two safety straps to be pulled through and secured around a child.

The child-seat liners of the present invention have many advantages over other child-seat liners. For example, in some embodiments, the child-seat liners of the present invention allow a single pair of straps (e.g. that are already attached to a shopping cart or high chair) to be easily retrieved by a user through the safety strap opening. This type of configuration allows the straps attached to a shopping cart basket (or other child seat) to be used to secure both the child-seat liner and the child to the shopping cart basket (or other child seat). In this regard, a user will be much less likely to forget to secure the child-seat liner to the child seat (e.g. since it would be obvious if no straps were around the child). This is advantageous as prior child-seat liners have required a user to secure the child in the child-seat liner with one set of straps (e.g., attached to the child-seat liner), and then secure the child-seat liner to the cart with a second pair of straps (e g, attached to the child-seat liner or present in the child-seat itself). Having to secure a second pair of straps (e.g. while coping with a child) is less than ideal and may be dangerous. A user may forget to secure the second pair of straps, thus risking that the child-seat liner will fall out of the child seat (e.g. shopping cart basket), along with the child. This unnecessarily risks injury or death for the child. Furthermore, trying to secure a second pair of straps in the back of child-seat liner wastes time and is difficult as a user usually has to maneuver around to see the straps in order to connect them. This may become even more difficult if a user is attempting to hold a child while securing a second set of straps in the back of the child-seat liner. The child-seat liners of the present invention avoid these problems and allows, in certain embodiments, a user to simply reach through a safety strap opening and retrieve a single pair of straps that may be used to secure both the child-seat liner and child to a child seat (e.g. shopping cart basket). In this regard, in certain embodiments, safety straps attached to a child-seat may be used to simultaneously secure the child and child-seat liner to child-seat.

In certain embodiments, the child-seat liners of the present invention do not contain attached safety straps. This is an improvement over many previous child-seat liners. For example, manufacturing is simplified and costs are reduced since safety straps do not need to be included. Also, as mentioned above, manipulating a single set of straps saves time and energy for a user.

The child-seat liners and child-seat liner cut-pieces of the present invention are not limited to any particular configuration. Exemplary configurations are shown in FIGS. 1–5 (described in more detail below). Any type of child-seat liner may be modified in accordance with the present invention. For example, child-seat liners may be modified by the addition of a flap in the back (e.g. placing a flap over existing safety strap openings, or cutting a safety strap opening such that a flap is generated). Also, child-seat liners may be modified by creating a single safety-strap opening in the back large enough for two safety straps to pass through. Child-seat liners may also be modified, for example, by removing the safety straps that may be attached to them (i.e. since they would not be necessary if a flap and/or safety strap opening is used in accordance with the present invention). Examples of commercially available child-seat liners (e.g. that may be modified with the teachings of the present invention) include: BUGGYBAGG seat liners available for sale on the internet (that also converts into a diaper bag, see also U.S. Pat. No. 5,829,835 to Rogers et al., herein incorporated by reference for all purposes); FLOPPY SEAT seat liners sold by Floppy Products Inc., Scottsdale, Ariz., see also, U.S. Pat. Nos. 5,967,606 and 6,129,418, both to Bergh et al., and both of which are herein incorporated by reference for all purposes; CLEAN SHOPPER seat liners sold by Babe Ease, LLC, Pelham, HH, (See, also, U.S. Pat. No. 6,129,417, to Cohen-Fyffe, herein incorporated by reference for all purposes).

Additional child-seat liners (e.g. that may be modified according to the present invention), are found in U.S. Pat. Nos. 5,678,888; 6,206,471; 6,164,721; 4,416,462; 5,967, 607; 5,547,250; 6,237,998; 4,204,695; 6,129,417; 6,036,264; 5,897,165; 4,655,502; 4,666,207; 5,330,250; and 4,805,937, all of which are herein incorporated by reference for all purposes.

The present invention also provides methods of making child-seat liners, and in particular, high volume methods of making child-seat liners. Generally, a child-seat liner pattern is employed (e.g. the pattern serves as a guide for a cutting device to cut a cut-piece). One method of cutting out the cut-piece employs a steel rule die and a steel rule die press. The steel rule die is configured into the shape of the pattern (See, e.g. FIG. 5B for an exemplary shape of steel rule die for a child-seat liner). About 10–12 layers of fabric may be laid on a press and the press brought down such that the steel rule die cuts through all of the layers (resulting in 10–12 child-seat liner cut-pieces in the shape of the steel rule die). Another method for cutting out the cut-pieces from layers of fabric (or other material) employs a system called Gerber cutting. Gerber cutting is a system where about 3–5 layers of fabric (or other material) are laid on a table like component and a sheet of plastic is put over the textile (or other material). The plastic is then vacuum shrunk or compressed to remove air. Then a cutting knife driven by a computer program cuts out the various cut-pieces from the fabric (or other material). Another method for cutting out cut-pieces employs laser cutting. In this method, the pattern is programmed into a computer, and then the computer controls the laser as it cuts the fabric (or other material) into various cut-pieces.

The present invention also provides methods for constructing child-seat liners from various cut-pieces. For example, three child-seat liner cut-pieces may be cut-out. One of the cut-pieces may be a softer material, and be used on the interior of a child-seat liner. One of the cut-pieces may be a durable material and be used for the exterior of a child-seat liner. The third cut-piece may be a filler material, and be used between the other two components in order to cushion the finished child-seat liner. The child-seat liner may be constructed, for example, by combining the softer material cut piece with the filler material (e.g by sewing these two together) to create a composite. The durable material cut-piece may then be sewn to itself in the shape of a child-seat liner, but be inside-out. The composite may then be placed on top (or inside) of the sewn durable fabric piece, and then sewn on three sides (e.g. along the seams). The durable fabric piece in then turned right side out, and further sewing completed (e.g. attaching a handle cover, or rear pouch, or simply sew up any remaining seams).

DETAILED DESCRIPTION OF THE INVENTION

Although not limited to any particular configuration, FIGS. 1–4 show various preferred protective articles of the present invention. These exemplary embodiments are described below to further illustrate the present invention and are not to be construed as limiting in any manner. Likewise, FIG. 5 shows preferred cut-pieces and patterns of the present invention. These patterns and cut-pieces are also described below to further illustrate the present invention and should be construed as limiting in any manner.

FIG. 1 shows an exemplary protective article of the present invention positioned in a shopping cart basket 12. FIG. 1 shows a child-seat liner connected to a handle cover 9. Various components of the child-seat liner are shown, including a bottom panel 2, a back panel 3, a front panel 4, and a side panel 5. The back panel 3 is shown with a safety strap opening 6 and a flap 7. The front panel 4 is shown with two front openings 8. The handle cover 9 is shown in a cut away view such that shopping cart handle 11 of shopping cart basket 12 may be seen. In preferred embodiments, the handle cover 9 covers the entire shopping cart handle 11 such that a child seated in the child-seat liner cannot touch any part of the shopping cart handle 11 (e.g. such that the child cannot come into contact with any germs located on the shopping cart handle). Also in preferred embodiments, as shown in FIG. 1, the front, back, bottom, and side panels cover the walls of the shopping cart basket (FIG. 1 shows one shopping cart basket side wall 16, and the shopping cart basket front wall 17). Two safety straps 13 are also shown coming through safety strap opening 6. Preferably, safety straps are attached to shopping cart basket 12.

Figure 2A:
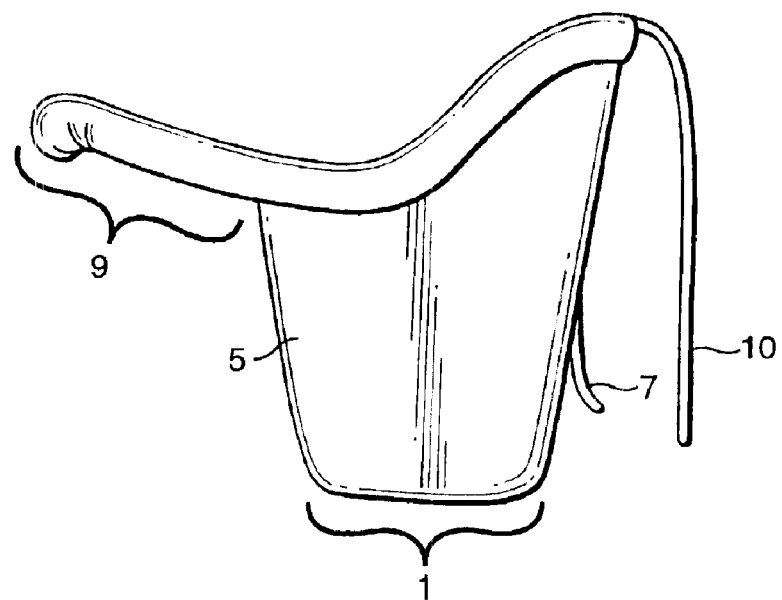
FIG. 2A shows a side view of one embodiment of the protective article of the present invention.

FIG. 2A shows a side view of an exemplary protective article of the present invention as it may appear in a shopping cart basket (not shown). FIG. 2A shows a child-seat liner 1 attached to a handle cover 9 and a rear pouch 10. The handle cover 9 may partially or completely cover, for example, a shopping cart handle such that a child seated in the child-seat liner 1 is not exposed to the filth and germs that may be present on the shopping cart handle. The rear pouch 10 may, for example, dangle off the back of a shopping cart basket. Accessory items, such as a wallet, purse, car keys, coupons, bottles, and childrens toys may be placed in the rear pouch 10. Only the side panel 5, and flap 7, of child-seat liner 1 are shown in this figure. The flap 7 is shown in an open position, extending out the back of child-seat liner 1.

Figure 2B:
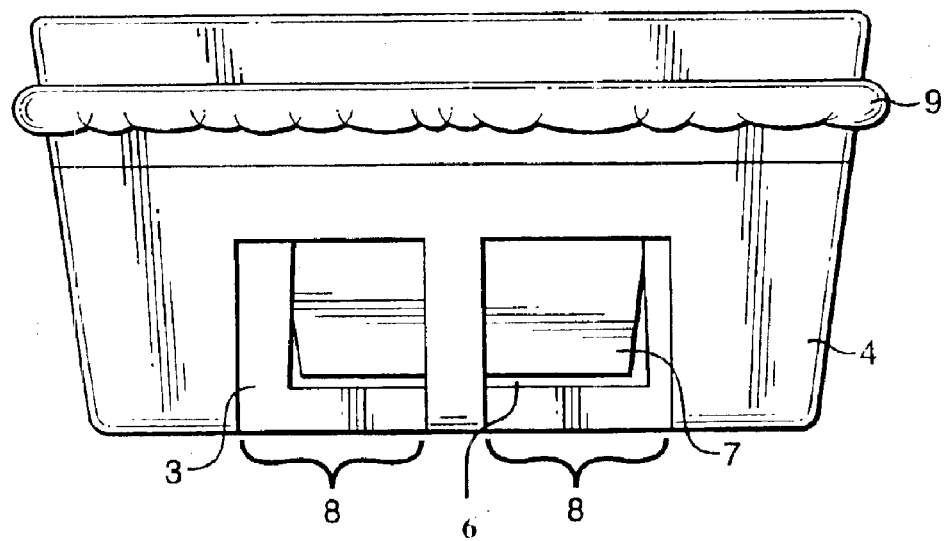
FIG. 2B shows a front view of one embodiment of the protective article of the present invention.

FIG. 2B shows a front view of an exemplary protective article of the present invention. FIG. 2B shows two front openings 8 (e.g. that allow the legs of an infant to pass through), and a front panel 4 of a child-seat liner. Also shown is a handle cover 9 that may, for example, be secured around the handle of a shopping cart. A back panel 3 of a child-seat liner is shown. The back panel 3 is shown with a safety strap opening 6 and a flap 7. The flap 7 is shown in an open position, but it may be moved to a closed position to substantially cover the safety strap opening 6.

Figure 3A:
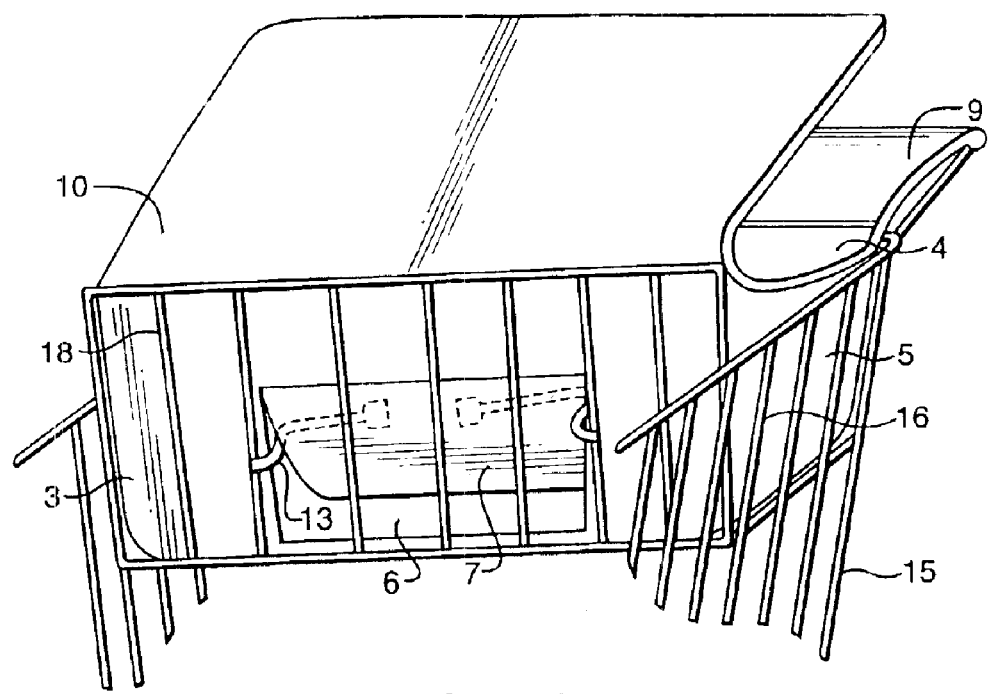
FIG. 3A shows a side and back view of one embodiment of the protective article of present invention positioned in a shopping cart basket of a shopping cart. This figure shows the rear pouch raised up so that the back of the child-seat liner may be viewed.

FIG. 3A shows a back and side view of an exemplary protective article of the present invention. The back panel 3 of the child-seat liner is shown attached to a rear pouch 10. The rear pouch 10 is shown in a raised position such that the back panel 3 of the child-seat liner may be seen. The back panel 3 is shown with a safety strap opening 6 and flap 7 in an open position. Two safety straps 13 are also shown extending through the safety strap opening 6. The child-seat liner is shown positioned in a shopping cart basket of a shopping cart 15. A shopping cart basket back wall 18 and shopping cart basket side wall 16 are shown in this figure. The back panel 3 of the child-seat liner is shown substantially covering the shopping cart basket back wall 18. Likewise, the side panel 5 of the child-seat liner is shown substantially covering the shopping cart basket side wall 16. This figure also shows a portion of the front panel 4 of the child-seat liner.

Figure 3B:
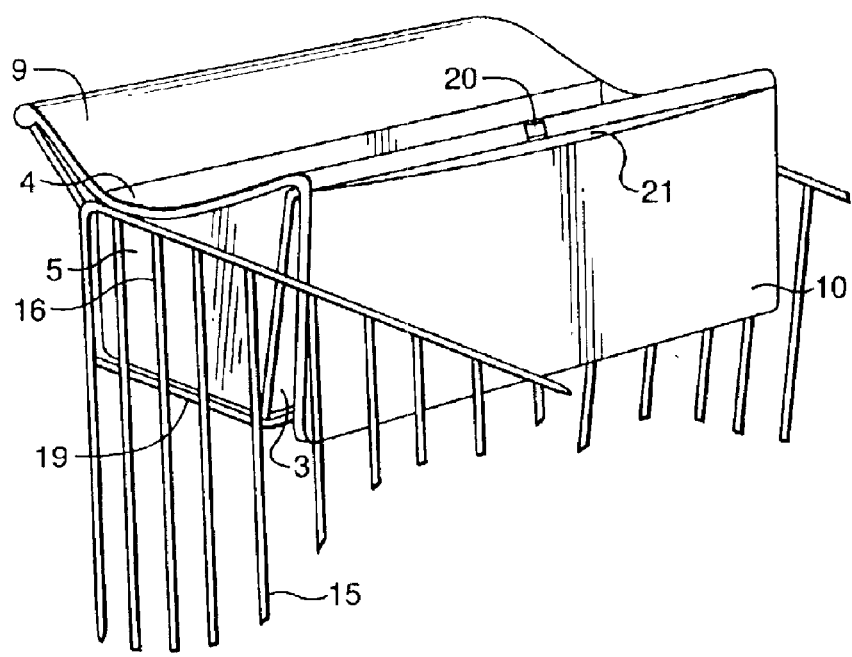
FIG. 3B shows a side and back view of one embodiment of the protective article of the present invention in a shopping cart basket of a shopping cart. This figure shows the rear pouch hanging over the edge of the shopping cart basket.

FIG. 3B shows a back and side view of an exemplary protective article of the present invention. The back panel 3 of the child-seat liner is mostly concealed in this figure by the rear pouch 10. The rear pouch 10 is shown hanging over the back of a shopping cart basket. The rear pouch is shown with a pouch opening 21 (e.g. in order to stow items in the rear pouch), and a storage strap fastener 20 (e.g. a snap or VELCRO strip that serves as a point of attachment for the storage strap). Also shown is a side panel 5 and a portion of front panel 4 of a child-seat liner positioned in a shopping cart basket of a shopping cart 15. The child-seat liner is shown resting on a shopping cart basket bottom 19. A shopping cart basket side wall 16 is shown, and is substantially covered by the side panel 5 of the child-seat liner. This figure also shows a handle cover 9 covering a shopping cart handle.

Figure 4A:
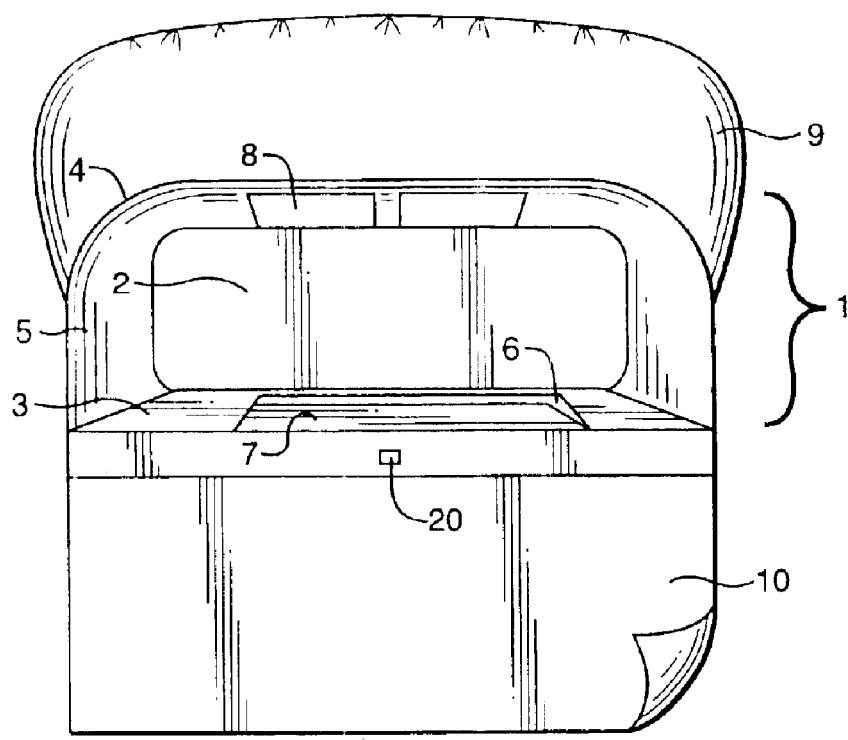
FIG. 4A shows an aerial view of one embodiment of the protective article of the present invention.

FIG. 4A shows an aerial view of an exemplary protective article of the present invention. A child seat-liner 1 is shown with a bottom panel 2, two side panels 5, a front panel 4, and a back panel 3. The front panel 4 is shown with two front openings. The back panel 3 is shown with a safety strap opening 6 and a flap 7. Also shown is a rear pouch 10 attached to back panel 3. The rear pouch 10 is shown with a storage strap fastener. This figure also shows a handle cover 9 attached to the front panel 4.

Figure 4B:
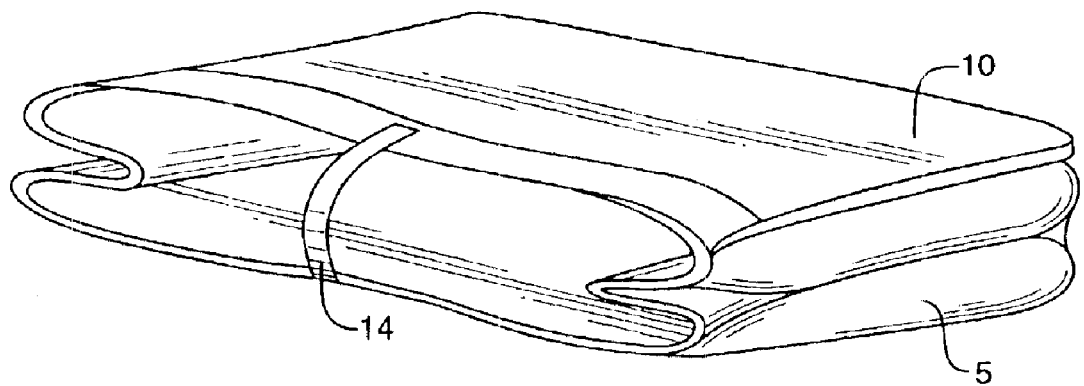
FIG. 4B shows a side and top view of the protective article of the present invention. This figure shows the article folded up in storing/carrying position.

FIG. 4B shows a perspective view of an exemplary protective article of the present invention in a storage or carrying configuration (e.g. this shows how the protective article may be folded up for carrying or storage when not in use). A side panel 5 of a child-seat liner is shown, along with a rear pouch 10. Also shown in this figure is a storage strap 14 (e.g. attached to the front panel), that may be used hold the article in a storage/carrying position (e.g. the storage strap 14 may attach to the storage strap fastener on the rear pouch 10).

Figure 5A:
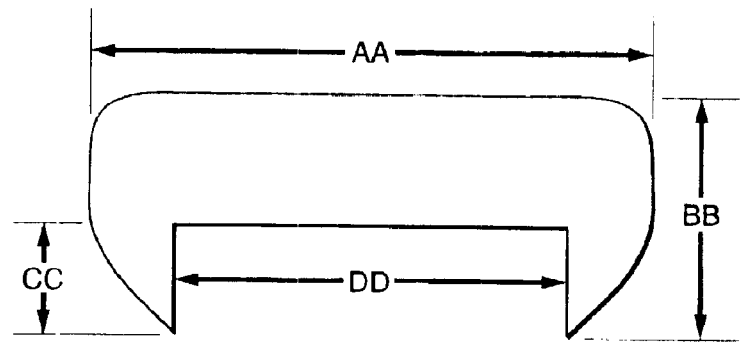
FIG. 5A shows a top view of an exemplary handle cover cut-piece and handle cover pattern.

FIG. 5 depicts various cut-pieces or patterns useful for making the protective articles of the present invention. This figure shows the shapes and dimensions for exemplary cut-pieces (e.g. cut out pieces of fabric), as well as patterns useful for generating cut-pieces. FIG. 5A shows an exemplary handle cover cut-piece and handle cover pattern. The dimensions for this cut-piece (and pattern) may vary as the present invention is not limited to any particular dimensions. For example, dimension AA may be about 20–40 inches, preferably about 28–32 inches, and more preferably about 30 and ½ inches. Dimension BB may be, for example, about 10–30 inches, preferably about 18–26 inches, and more preferably about 22 and ½ inches. Dimension CC may be, for example, about 3–20 inches, preferably about 8–12 inches, and more preferably about 10 inches. Dimension DD may be, for example, about 10 to 30 inches, preferably about 15–20 inches, and more preferably about 17 and ¾ inches.

Figure 5B:
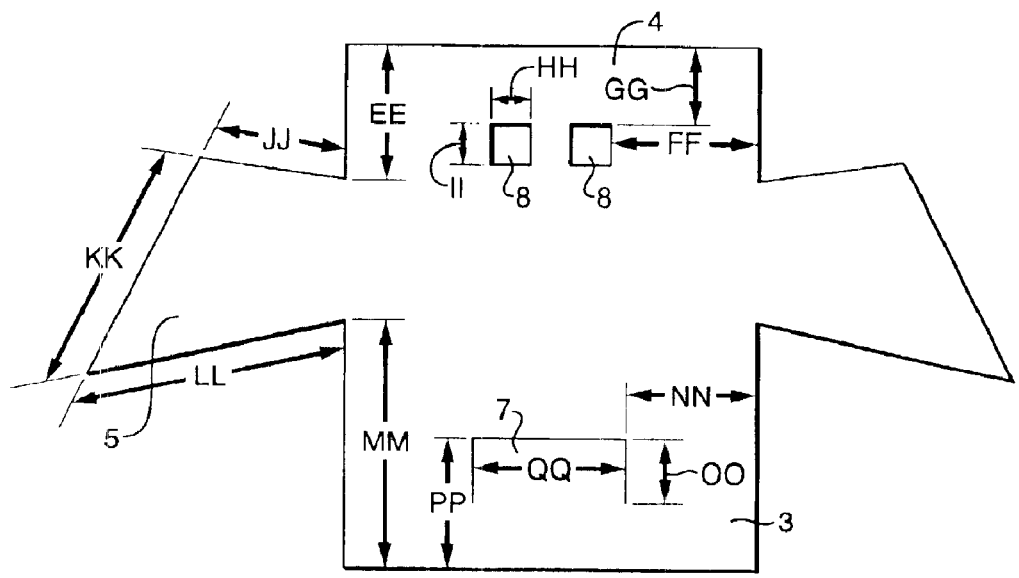
FIG. 5B shows a top view of one embodiment of a child-seat liner cut-piece and child-seat liner pattern of the present invention.

FIG. 5B shows an exemplary child-seat liner cut-piece and child-seat liner pattern. This figure may also be considered to show an exemplary die rule. Various areas are shown, including a bottom panel 2, a back panel 3 (with a flap 7), a front panel 4 (with two front openings 8), and two side panels 5. The dimensions for this exemplary cut-piece (and pattern) may vary as the present invention is not limited to any particular dimensions. For example, dimension EE may be, for example about 5–10 inches, and preferably about 7 and ⅞ inches. Dimension FF may be, for example, about 3–8 inches, and preferably about 5 inches. Dimension GG may be, for example, about 1–5 inches, and preferably about 3 inches. Dimension HH may be, for example, about 2–6 inches and preferably about 4 inches. Dimension II may be, for example, about 2–6 inches, and preferably about 4 inches. Dimension JJ may be, for example, about 5–15 inches, and preferably about 8 and ⅝ inches. Dimension KK may be, for example, about 10 to 15 inches, and preferably about 13 inches. Dimension LL may be, for example, about 9 to about 14 inches, and preferably about 12 and ¾ inches. Dimension MM may be, for example, about 9 to about 16 inches, and preferably 13 and ½ inches. Dimension NN may be, for example, about 2–7 inches, and preferably about 5 inches. Dimension OO may be, for example, about 2–6 inches, and preferably about 3–5 inches, and more preferably about 4 inches. Dimension PP may be, for example, about 4–12 inches, and preferably about 8 inches. Dimension QQ may be, for example, about 2–25 inches, preferably about 5–20 inches, more preferably about 7–15 inches, and most preferably about 11 inches (e.g 8 inches, 9 inches, 10 inches, 11 inches, 12 inches or 13 inches).

Figure 5C:
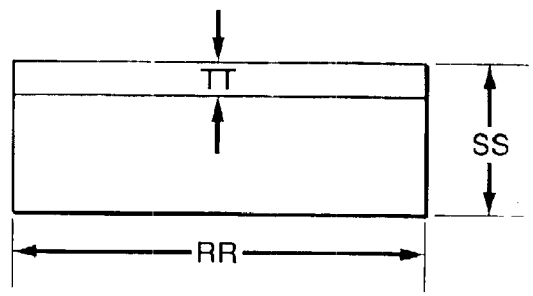
FIG. 5C shows a top view of an exemplary rear pouch cut-piece and rear pouch pattern.

FIG. 5C shows an exemplary rear pouch cut-piece and rear pouch pattern of the present invention. The dimensions for this exemplary cut-piece (and pattern) may vary as the present invention is not limited to any particular dimensions. For example, dimension RR may be, for example, about 12–25 inches, and preferably about 18 and ½ inches. Dimension SS may be, for example, about 5–15 inches, and preferably about 10 inches. Dimension TT may be, for example, about 1–3 inches, and preferably about 2 inches.

All publications and patents mentioned in the above specification are herein incorporated by reference. Various modifications and variations of the described articles, devices, methods and systems of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be within the scope of the following claims.

We claim:

1. An article comprising a child-seat liner, wherein said child-seat liner comprises;
   i) a bottom panel,
   ii) a back panel connected to said bottom panel, wherein said back panel comprises a flap, and wherein said flap is moveable between a closed position and an open position, wherein said open position exposes a safety strap opening in said back panel, and wherein said safety strap opening is configured to allow at least two safety straps affixed to another article to be pulled therethrough, and
   iii) a front panel connected to said bottom panel, wherein said front panel comprises two front openings configured to allow a child's legs to pass therethrough.

2. The article of claim 1, wherein said child-seat liner further comprises two side panels, wherein each of said side panels is connected to said bottom panel.

3. The article of claim 1, wherein said child-seat liner does not contain attached safety straps.

4. The article of claim 1, further comprising a handle cover, wherein said handle cover is connected to said front panel.

5. The article of claim 1, further comprising a rear pouch, wherein said rear pouch is connected to said back panel.

6. An article comprising a child-seat liner, wherein said child-seat liner comprises;
   i) a bottom panel,
   ii) a back panel connected to said bottom panel, wherein said back panel comprises a first safety strap opening, wherein said first safety strap opening is configured to allow at least two safety straps affixed to another article to be pulled therethrough, and wherein said back panel does not contain a second safety strap opening, and
   iii a front panel connected to said bottom panel, wherein said front panel comprises two front openings configured to allow a child's legs to pass therethrough.

7. The article of claim 6, wherein said child-seat liner further comprises two side panels, wherein each of said side panels is connected to said bottom panel.

8. The article of claim 6, wherein said child-seat liner does not contain attached safety straps.

9. The article of claim 6, further comprising a handle cover, wherein said handle cover is connected to said front panel.

10. The article of claim 6, further comprising a rear pouch, wherein said rear pouch is connected to said back panel.

11. The article of claim 6, wherein said back panel further comprises a flap, wherein said flap is moveable between a closed position substantially covering said first safety strap opening and an open position that exposes said first safety strap opening.

12. A method of making a child-seat liner comprising;
    a) providing;
        i) a child-seat liner pattern,
        ii) first textile material,
        iii) second textile material,
        iv) filler material, and
        v) a cutting device, and
    b) cutting said first textile material, said second textile material, and said filler material with said cutting device using said child-seat pattern as a guide such that a first cut-piece, a second cut-piece, and a filler cut-piece are generated, and
    c) combining said first cut-piece, said second cut-piece and said filler cut-piece such that a child-seat liner is generated with said filler cut-piece between said first cut-piece and said second-cut piece, wherein said child-seat liner generated comprises;
        i) a bottom panel, and
        ii) a back panel connected to said bottom panel, wherein said back panel comprises a flap, and wherein said flap is moveable between a closed position and an open position, wherein said open position exposes forms a safety strap opening in said back panel, and wherein said safety strap opening is configured to allow at least two safety straps affixed to another article to he pulled therethrough, and
        iii) a front panel connected to said bottom panel, wherein said front panel comprises two front openings configured to allow a child's legs to pass therethrough.

13. The method of claim 12, wherein said combining comprises sewing said first cut-piece to said filler cut-piece in order to generate a composite cut-piece.

14. The method of claim 13, wherein said combining further comprises sewing said second cut-piece to itself in the form of a child-seat liner.

15. The method of claim 14, wherein said combining further comprises sewing said second-cut piece to said composite cut piece.

16. The method of claim 12, further comprising a step of sewing a handle cover cut-piece to said child-seat liner.

* * * * *